US008510592B1

(12) United States Patent
Chan

(10) Patent No.: US 8,510,592 B1
(45) Date of Patent: Aug. 13, 2013

(54) PCI ERROR RESILIENCE

(75) Inventor: Johnny Kang-wing Chan, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 345 days.

(21) Appl. No.: 12/560,296

(22) Filed: Sep. 15, 2009

(51) Int. Cl.
*G06F 11/00* (2006.01)

(52) U.S. Cl.
USPC .......................................................... 714/5.1

(58) Field of Classification Search
USPC ................................................ 714/5.1, 44
See application file for complete search history.

(56) References Cited

U.S. PATENT DOCUMENTS

| 5,815,647 | A  | * | 9/1998  | Buckland et al. ................. 714/3 |
| 6,085,333 | A  | * | 7/2000  | DeKoning et al. ........... 714/6.32 |
| 6,304,948 | B1 | * | 10/2001 | Motoyama et al. ........... 711/162 |
| 6,557,121 | B1 | * | 4/2003  | McLaughlin et al. .......... 714/44 |
| 7,111,084 | B2 | * | 9/2006  | Tan et al. ........................ 710/15 |
| 7,281,072 | B2 | * | 10/2007 | Liu et al. ....................... 710/240 |
| 7,711,983 | B2 | * | 5/2010  | Hatasaki et al. ................. 714/13 |
| 7,774,638 | B1 | * | 8/2010  | Cavanagh et al. ............. 714/4.2 |
| 2004/0073831 | A1 | * | 4/2004  | Yanai et al. ...................... 714/7 |
| 2004/0230861 | A1 | * | 11/2004 | Bailey et al. ...................... 714/6 |
| 2006/0107112 | A1 | * | 5/2006  | Michaelis et al. .............. 714/15 |
| 2006/0248386 | A1 | * | 11/2006 | Barga et al. ..................... 714/15 |
| 2007/0011500 | A1 | * | 1/2007  | Dasari et al. .................. 714/100 |
| 2007/0043975 | A1 | * | 2/2007  | Varadarajan et al. ........... 714/25 |
| 2008/0184077 | A1 | * | 7/2008  | Kuttan et al. ................... 714/48 |
| 2008/0201609 | A1 | * | 8/2008  | Lu et al. .......................... 714/27 |
| 2009/0249013 | A1 | * | 10/2009 | Daud et al. .................... 711/163 |

* cited by examiner

*Primary Examiner* — Michael Maskulinski
*Assistant Examiner* — Neil Miles
(74) *Attorney, Agent, or Firm* — Blakely, Sokoloff, Taylor & Zafman LLP

(57) ABSTRACT

Error handling and recovery, implemented in a storage server, detects an error in a peripheral device of the storage server. If the error is recoverable, the system contains the error by isolating the peripheral device to prevent the generation of additional interrupt signals and migrates operations of the peripheral device to a back-up peripheral device. The system initiates error recovery by calling a recovery routine and a reinitialization routine, both provided by a device driver for the peripheral device. After device recovery is complete, the system migrates operations of the back-up peripheral device back to the peripheral device.

11 Claims, 6 Drawing Sheets

PCI ERROR RESILIENCE

TECHNICAL FIELD

This invention relates to the field of network storage systems and, in particular, to error recovery in a network storage system.

BACKGROUND

In modern computer networks, a storage server can be used for many different purposes, such as to provide multiple users with access to shared data or to back-up mission critical data. A file server is an example of a storage server which operates on behalf of one or more clients to store and manage shared files in a set of mass storage devices, such as magnetic or optical storage based disks or tapes. The mass storage devices are typically organized into one or more volumes of Redundant Array of Independent (or Inexpensive) Disks (RAID).

A file server may include several core components, including, one or more processors, a system memory, and a communications bus. The communications bus may be a Peripheral Component Interconnect (PCI) bus to connect the core components to one or more peripheral components on the PCI bus. Connected to the PCI bus, may be for example, a nonvolatile random access memory (NVRAM), one or more internal mass storage devices, a storage adapter, a network adapter, a cluster interconnect adapter, or other components.

In conventional systems, to protect against a failure of the file server, an approach called clustered failover (CFO) has been used, in which a source file server and a destination file server operate as "cluster partners." The source file server and the destination file server are connected by a high-speed cluster interconnect. In the event of a failure in either the source file server or the destination file server, storage operations are taken over by the other file server in the cluster pair, to service further requests from a client. Having complete redundancy of the storage server, including core components such as processors and memory, can be a prohibitively expensive solution in certain cases.

Conventional systems also have the weakness of not being able to survive input/output (I/O) errors. Any error, such as a PCI error, can bring the file server down requiring the transfer of operations to the other server in the cluster pair. Such system failures are sometimes unnecessary, however, considering that not all PCI devices are essential for system survival. Furthermore, not all PCI errors are the result of hardware failures. Sometimes an error is caused by an intermittent driver problem and reinitialization is a possible solution. Additionally, failures can also be a combination of software interaction that triggers a hardware problem. Finally, there may be hardware failures that are permanent. It may not be easy to distinguish between these different cases and determine when complete transfer of storage operations is necessary or when device reinitialization is possible.

SUMMARY OF THE INVENTION

Error handling and recovery, implemented in a storage server, detects an error in a peripheral device of the storage server. If the error is recoverable, the system contains the error by isolating the peripheral device to prevent the generation of additional interrupt signals and migrates operations of the peripheral device to a back-up peripheral device. The system initiates error recovery by calling a recovery routine and a reinitialization routine, both provided by a device driver for the peripheral device. After device recovery is complete, the system migrates operations of the back-up peripheral device back to the peripheral device.

BRIEF DESCRIPTION OF THE DRAWINGS

The present invention is illustrated by way of example, and not by way of limitation, in the figures of the accompanying drawings.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Embodiments are described to handle input/output (I/O) errors in a storage server and recover from them without affecting operation of the server. In one embodiment, the system detects an error in a peripheral device of the storage server. An interrupt signal is generated to report the error to the operating system of the storage server. The operating system shuts down the peripheral device to contain the error and migrates operations of the peripheral device to a back-up peripheral device. An error recovery process and a device reinitialization process are executed to reset the peripheral device which suffered the error.

Figure 1:
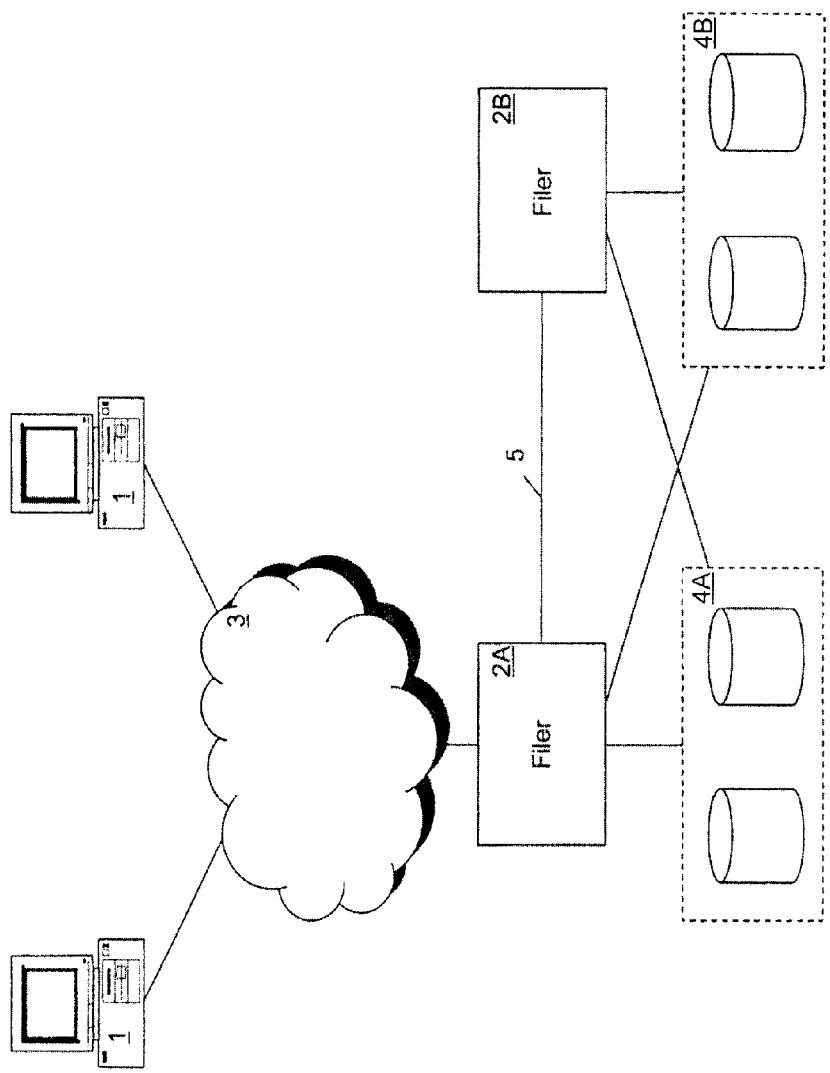
FIG. 1 illustrates a block diagram of a network configuration according to one embodiment.

FIG. 1 is a block diagram illustrating a network configuration according to one embodiment. In this embodiment, a source storage server 2A, located at a primary location, is coupled locally to a set of mass storage devices 4A, to a set of clients 1 through a network 3, such as a local area network (LAN), and to a destination storage server 2B, located at a remote mirror site. Each of the clients 1 may be, for example, a conventional personal computer (PC), workstation, or the like. The destination storage server 2B, located at the mirror site, is coupled locally to a separate set of mass storage devices 4B at the mirror site. The mass storage devices 4A and 4B may be, for example, conventional magnetic disks, optical disks such as CD-ROM or DVD based storage, magneto-optical (MO) storage, or any other type of non-volatile storage devices suitable for storing large quantities of data. In one embodiment, the mass storage devices 4A and 4B are each a flash-based solid-state device (SSD), sometimes known as flash drives. The source storage server 2A receives and responds to various read and write requests from the clients 1.

As shown, the source storage server 2A and destination storage server 2B are connected by an interconnect 5.

In one embodiment, mass storage device 4A has data arranged in a logical volume. Similarly, there may be a logical volume on mass storage device 4B. In this situation, the volume of mass storage device 4A is referred to as the source volume and the volume of mass storage device 4B as the destination volume. Examples of file system types for the logical volumes on storages devices 4A and 4B may include flexible volumes, striped volumes, traditional volumes or other volume types.

Figure 2:
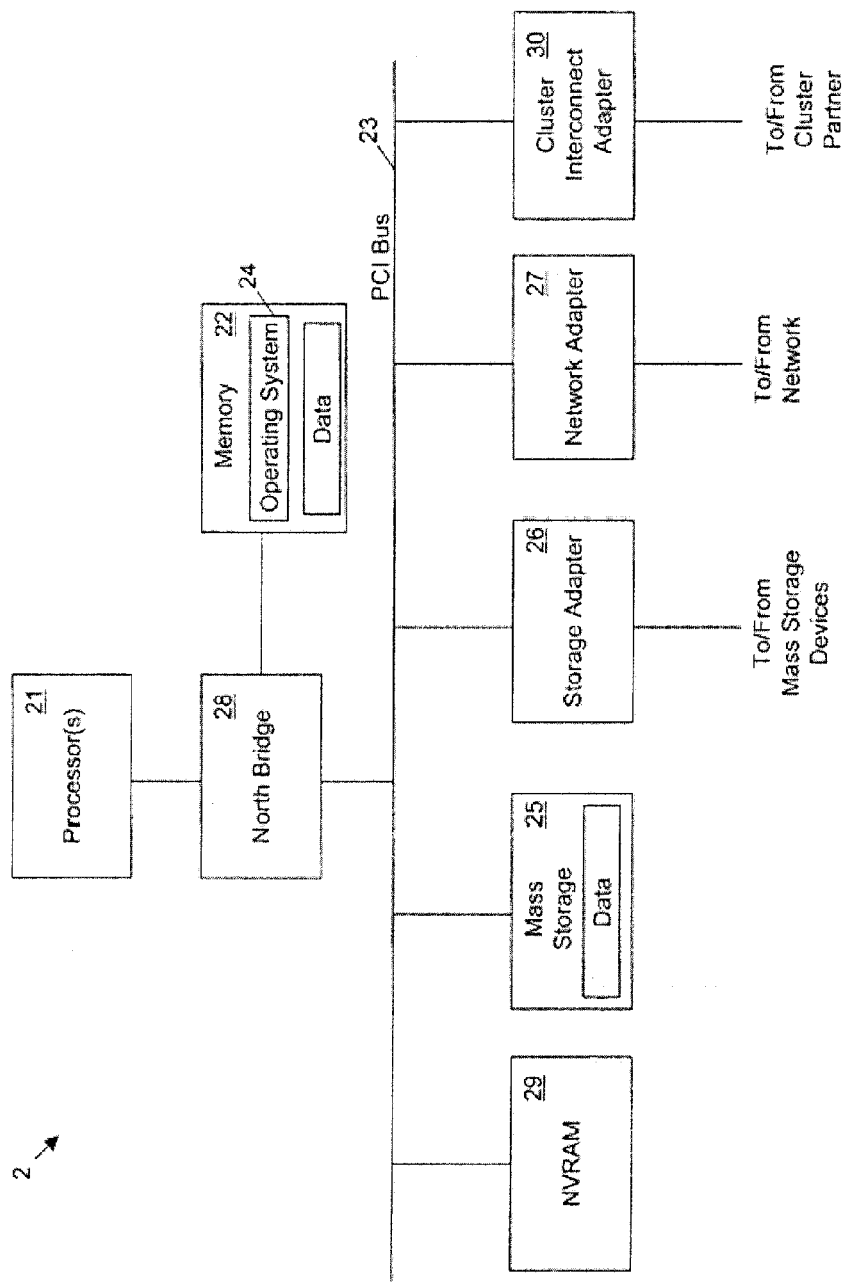
FIG. 2 illustrates a block diagram of one embodiment of the hardware architecture of a storage system.

The storage servers 2A and 2B may have a distributed architecture, for example, including a separate N-("network") blade and D-("disk") blade (e.g., storage adapter 26 and network adapter 27 of FIG. 2). In such an embodiment, the N-blade is used to communicate with clients 1, while the D-blade includes the file system functionality and is used to communicate with the storage subsystems 4A and 4B. In one embodiment, the N-blade and D-blade communicate with each other using an internal protocol. In one embodiment, where the N-blade or D-blade has its own separate processor and memory, separate from that of the storage server, the error handling and recovery method, as further described below, is implemented within the N-blade or D-blade. Alternatively, the storage servers 2A and 2B have an integrated architecture, where the network and data components are all contained in a single box. The storage servers 2A and 2B further may be coupled through a switching fabric to other similar storage systems (not shown) which have their own local storage subsystems. In this way, all of the storage subsystems can form a single storage pool, to which any client of any of the storage systems has access.

In one embodiment, clustered failover (CFO), in which the source storage server 2A and the destination storage server 2B operate as "cluster partners," is used to protect against a failure of the source storage server 2A. The example of FIG. 1 shows two storage servers 2A and 2B connected to each other and to each other's mass storage devices 4A and 4B, for CFO. As shown, the source storage server 2A and destination storage server 2B are connected by a high-speed cluster interconnect 5. The cluster interconnect can be implemented as, for example, one or more direct copper links, or as a Fibre Channel arbitration loop (FCAL). Each storage server has a remote direct memory access (RDMA) capability by which it can communicate over the cluster interconnect 5. The cluster interconnect 5 can also be used for non-DMA based communications, such as send/receive operations.

FIG. 2 is a block diagram showing the architecture of a storage server 2, representing either the source storage server 2A or the destination storage server 2B. The storage server 2 includes one or more processors 21 and a system memory 22 coupled to each other by a north bridge 28. The north bridge 28 is also coupled to a communications bus 23, which in one embodiment, may be a Peripheral Component Interconnect (PCI) bus. The north bridge 28 provides an interface between peripheral components on the PCI bus and the processors 21 and system memory 22.

Each processor 21 is a central processing unit (CPU) of the storage server 2 and, thus, controls the overall operation of the storage server 2. In certain embodiments, a processor 21 accomplishes this by executing software stored in system memory 22. Such software may include the operating system 24 of the storage server 2. Each processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The system memory 22 is a random access memory (RAM) which stores, among other things, the operating system 24 of the storage server 2, in which the techniques introduced herein can be implemented.

Connected to the PCI bus 23 are various peripheral devices. In one embodiment, the peripheral devices include an NVRAM 29, one or more internal mass storage devices 25, a storage adapter 26, a network adapter 27, and a cluster interconnect adapter 30. Internal mass storage devices 25 may be or include any conventional medium for storing large volumes of data in a non-volatile manner, such as one or more disks. The storage adapter 26 allows the storage server 2 to access the external mass storage devices 4 and may be, for example, a Fibre Channel adapter or a SCSI adapter. The network adapter 27 provides the storage server 2 with the ability to communicate with remote devices such as the clients 1 over a network and may be, for example, an Ethernet adapter. The cluster interconnect adapter 30 provides the storage server 2 with the ability to communicate with its cluster partner.

Figure 3:
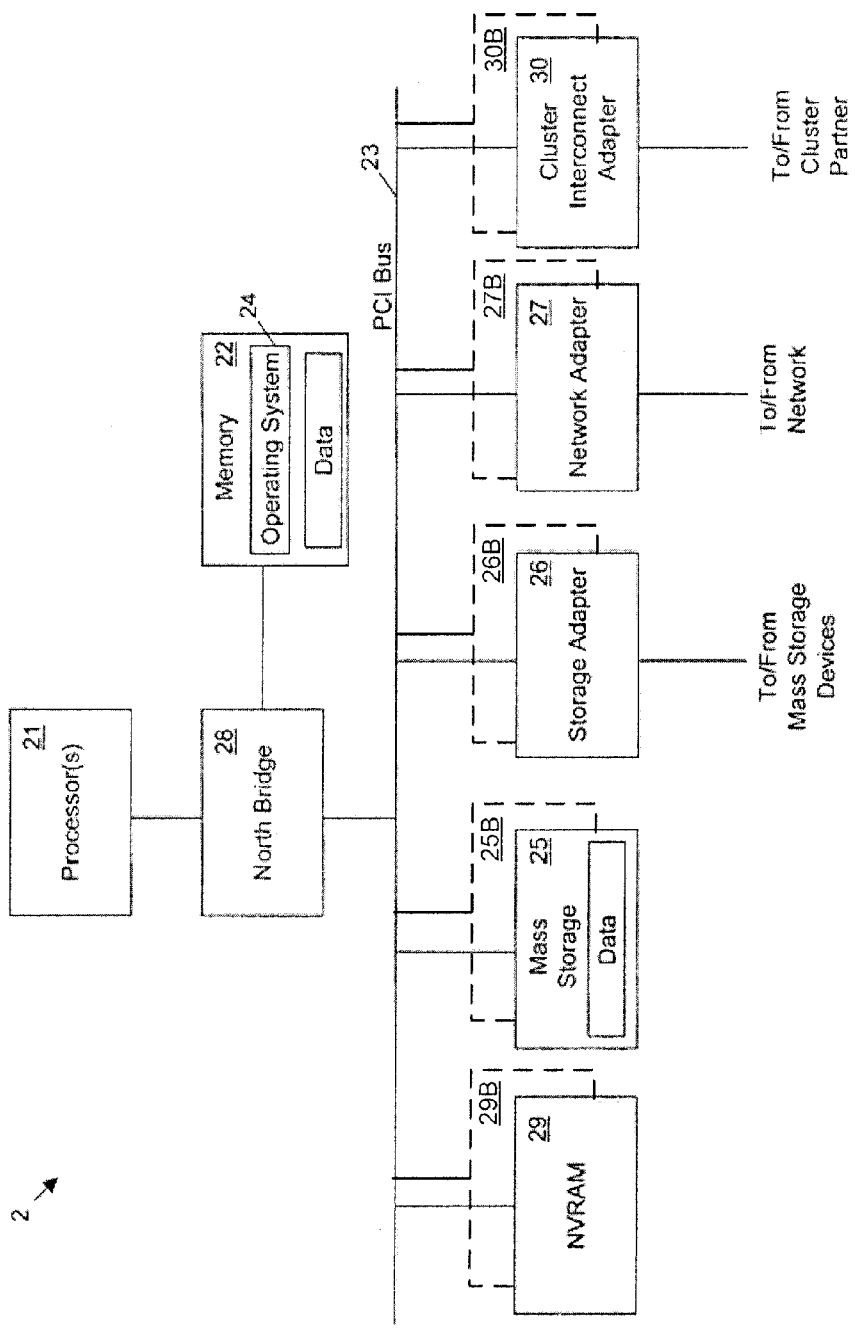
FIG. 3 illustrates a block diagram of one embodiment of the hardware architecture of a storage system.

FIG. 3 is a block diagram showing the architecture of a storage server according to one embodiment. In this embodiment, the peripheral components (i.e., NVRAM 29, mass storage 25, storage adapter 26, network adapter 27, cluster interconnect adapter 30) of the storage server 2 have back-up redundancy. A back-up peripheral component is present for each primary peripheral component, such that if an error occurs in communicating with the primary peripheral component, operations of the component may be migrated to the back-up. The back-up peripheral components in this embodiment include NVRAM 29B, mass storage 25B, storage adapter 26B, network adapter 27B, and cluster interconnect adapter 30B. The back-up peripheral components are similarly connected to each other and to the other system components through PCI bus 23. These peripheral components and their back-ups are merely one example and in alternative embodiments, there may be more or fewer peripheral components and back-ups. In addition, not every peripheral component need have a back-up.

Figure 4:
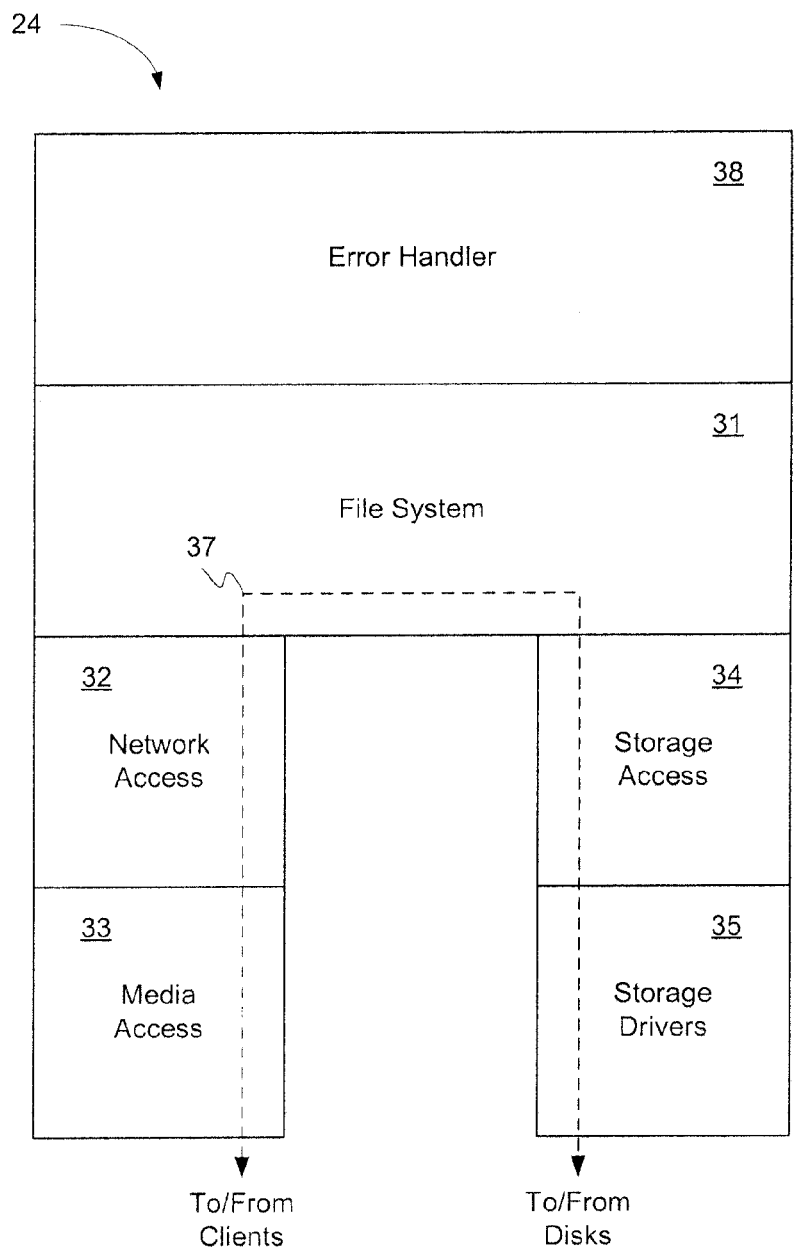
FIG. 4 illustrates one embodiment of the architecture of the operating system of a storage system.

FIG. 4 shows an example of the operating system 24 of a storage server, such as storage server 2A or 2B, shown in FIG. 1. As shown, the operating system 24 includes several software modules, or "layers." These layers include a file system 31. The file system 31 is application-layer software that imposes a structure (hierarchy) on the data stored in the storage subsystem 4A or 4B and services read/write requests from clients 1. Note that the term "file system" also sometimes refers to the actual stored data or its hierarchical structure; the particular meaning in any given instance will be readily apparent to those skilled in the relevant art, from context.

The operating system 24 also includes a network access layer 32 and an associated media access layer 33, to allow the file server to communicate over the network 3 (e.g., with clients 1). The network access layer 32 implements one or more of various higher-level network protocols, such as Network File System (NFS), Common Internet File System (CIFS), Hypertext Transfer Protocol (HTTP) and/or Transmission Control Protocol/Internet Protocol (TCP/IP). The media access layer 33 includes one or more drivers which implement one or more lower-level protocols to communicate over the network 3, such as Ethernet.

The operating system 24 also includes a storage access layer 34 and an associated storage driver layer 35, to allow the file server to communicate with the storage subsystem. The storage access layer 34 implements a higher-level disk storage protocol, such as RAID, while the storage driver layer 35 implements a lower-level storage device access protocol, such as Fibre Channel Protocol (FCP) or small computer system interface (SCSI). Also shown in FIG. 4 is the path 37 of data flow, through the operating system 24, associated with a read or write operation.

In certain embodiments, as illustrated in FIG. 4, the operating system 24 further includes an error handler layer 38, to implement I/O error handling and recovery for the storage server. The error handler layer 38 of operating system 24 is used to detect an error in one of the storage server's peripheral devices, contain the error, and migrate operations of the peripheral device to a back-up peripheral device. In a device that implements the PCI standard for internal communications, error handler layer 38 can make use of certain pre-existing features in the PCI standard, as will be described below. In alternative embodiments, the error handling and recovery system can work with any industrial standard that includes the features of error reporting, error handling and error containment.

Figure 5:
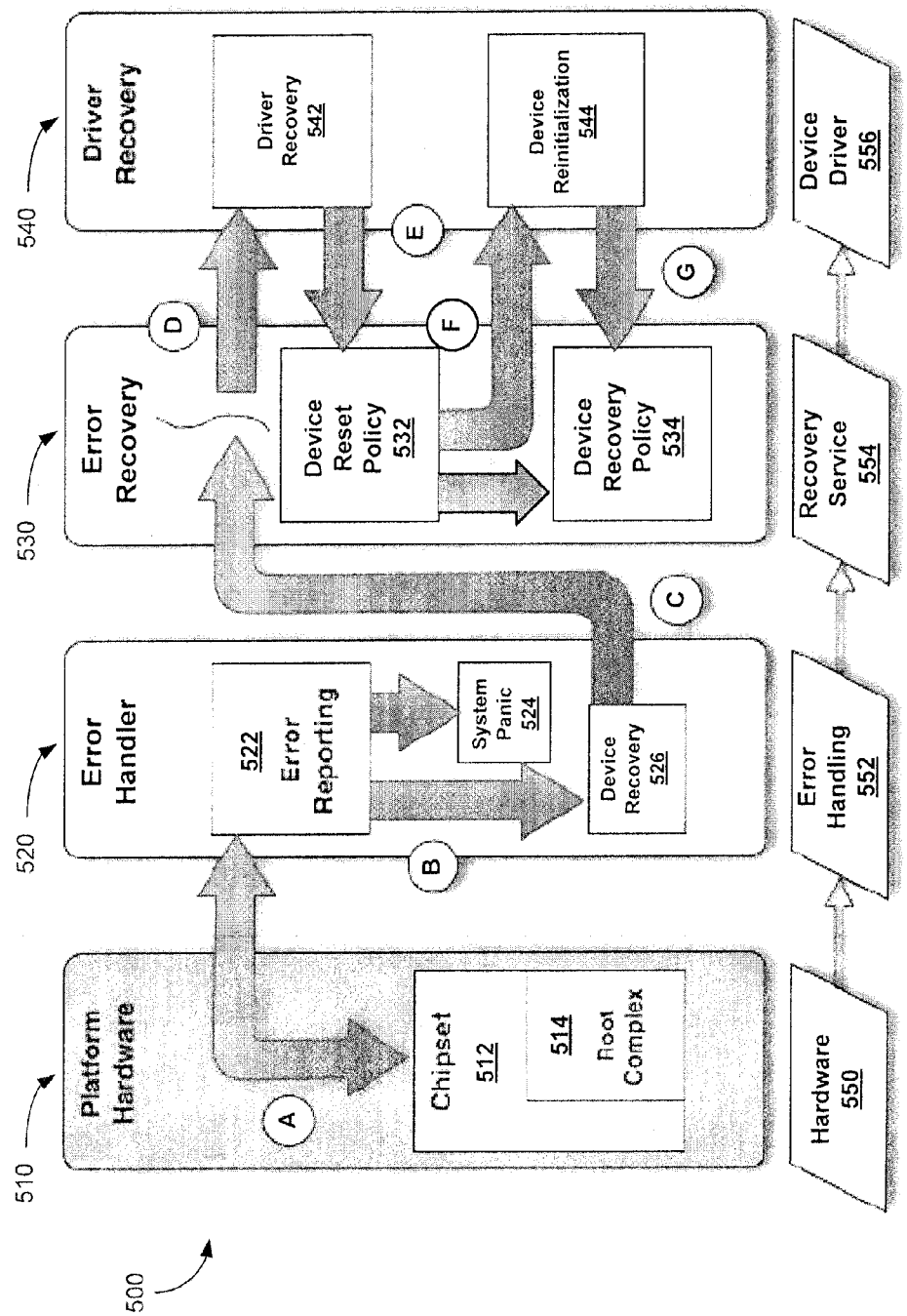
FIG. 5 illustrates a block diagram of the error handling and recovery architecture according to one embodiment.

FIG. 5 illustrates a block diagram of the error handling and recovery architecture 500 according to one embodiment. For ease of explanation, the architecture 500 is described with respect to four domains. Hardware 550 includes the hardware portions of the storage server, such as storage server 2. Error Handling 552 is software, executable by processor 21, which reports and processes any errors in hardware 550. In other embodiments, Error Handling 552 may be implemented in software, firmware, or a combination thereof. Recovery Service 554 enables recovery from the error in conjunction with Device Driver 556 which supplies recovery and reinitialization processes for the failed peripheral device.

The Platform Hardware domain 510 represents the physical hardware 550 of a storage server implementing the error handling and recovery. In one embodiment, the Platform Hardware domain 510 includes the hardware architecture shown in FIG. 3. The Platform Hardware domain 510 includes a chipset 512 which includes a root complex 514 to process PCI operations. In one embodiment, the root complex 514 is a PCI-Express (PCIe) root complex.

The Error Handler domain 520 represents the error handling software 552 of the architecture 500. The Error Handler domain 520 may be included in the error handler layer 38 of operating system 24. When a peripheral device, such as peripheral devices 25, 26, 27, 29 and 30 of FIG. 3, detects an error, an error message is generated and sent upstream to the operating system 24 of the storage server 2. The error message is subsequently propagated to the root complex 514 in Platform Hardware domain 510. If the error is deemed to be fatal to the peripheral device by error handling software 552, the chipset 512 will assert an external signal which, in turn, can be the source of an interrupt to the CPUs, such as processor 21.

Error reporting in the Error Handler domain 520 is triggered by the interrupt received from the Platform Hardware domain 510. In one embodiment, where the storage server is a multi-processor system, all the processors, such as processors 21, will receive the interrupt and are synchronized by error handler software 552. One processor is chosen to handle the interrupt because the data structure and hardware access is exclusive. The interrupt is received in the Error Handler domain 520 at an error reporting module 522.

The device recovery operation at module 526 includes the tasks of device error containment and a device data structure update. Error containment may include setting up the device to stop the continuous reporting of the error and in the data structure update, the device driver is marked to not accept further requests from operating system 24. Once the failed peripheral device is setup for error recovery at module 526, a signal is sent to the Error Recovery domain 530, as shown at arrow C. The processor(s) exits from the error handler mode and the recovery operations are handled in the Error Recovery 530 and Driver Recovery 540 domains.

The Error Recovery domain 530 represents the recovery service 554 within the operating system 24 that handles the recovery of a peripheral device from an error. The Error Recovery domain 530 works in conjunction with the device driver 556 for the peripheral device to recover from the error. Components of the device driver 556 are shown in FIG. 5 as Driver Recovery domain 540. When the device driver 556 registers with error handling and recovery, it supplies a recovery routine for the peripheral device from driver recovery module 542. In one embodiment, the recovery routine is called at arrow D. In one embodiment, the device driver 556 also supplies a device reinitialization routine which is called from device reinitialization module 544 at arrow F. The device reinitialization routine is used to reinitialize the failed peripheral device after recovering from the failure.

The driver recovery module 542 also returns a reset policy code to device reset policy module 532 in the Error Recovery domain 530, as shown at arrow E. The details of the reset policy code will be discussed further below. If the driver recovery module 542 has successfully reset the failed device, driver recovery module 542 returns a no action code to the device reset policy module 532.

A reinitialization routine from the device reinitialization module 544 is called from device reset policy module 542 at arrow F. The routine reinitializes the failed device after recovery. The reinitialization process may be the same as the initial boot-time initialization for the device assuming the driver recovery module 542 has performed a total cleanup job. The device reinitialization module 544 returns the recovery policy code to the device recovery policy module 534 at arrow G. Should the initialization process fail, device driver 556 may instruct the recovery policy module 554 to power off the device if its failure will not affect system integrity. Otherwise the return code will force the system to panic. After the device driver 556 exits the device reinitialization routine, control will return to the device recovery policy module 534, which performs the recovery policy based on the return code of the device reinitialization module 544.

Figure 6:
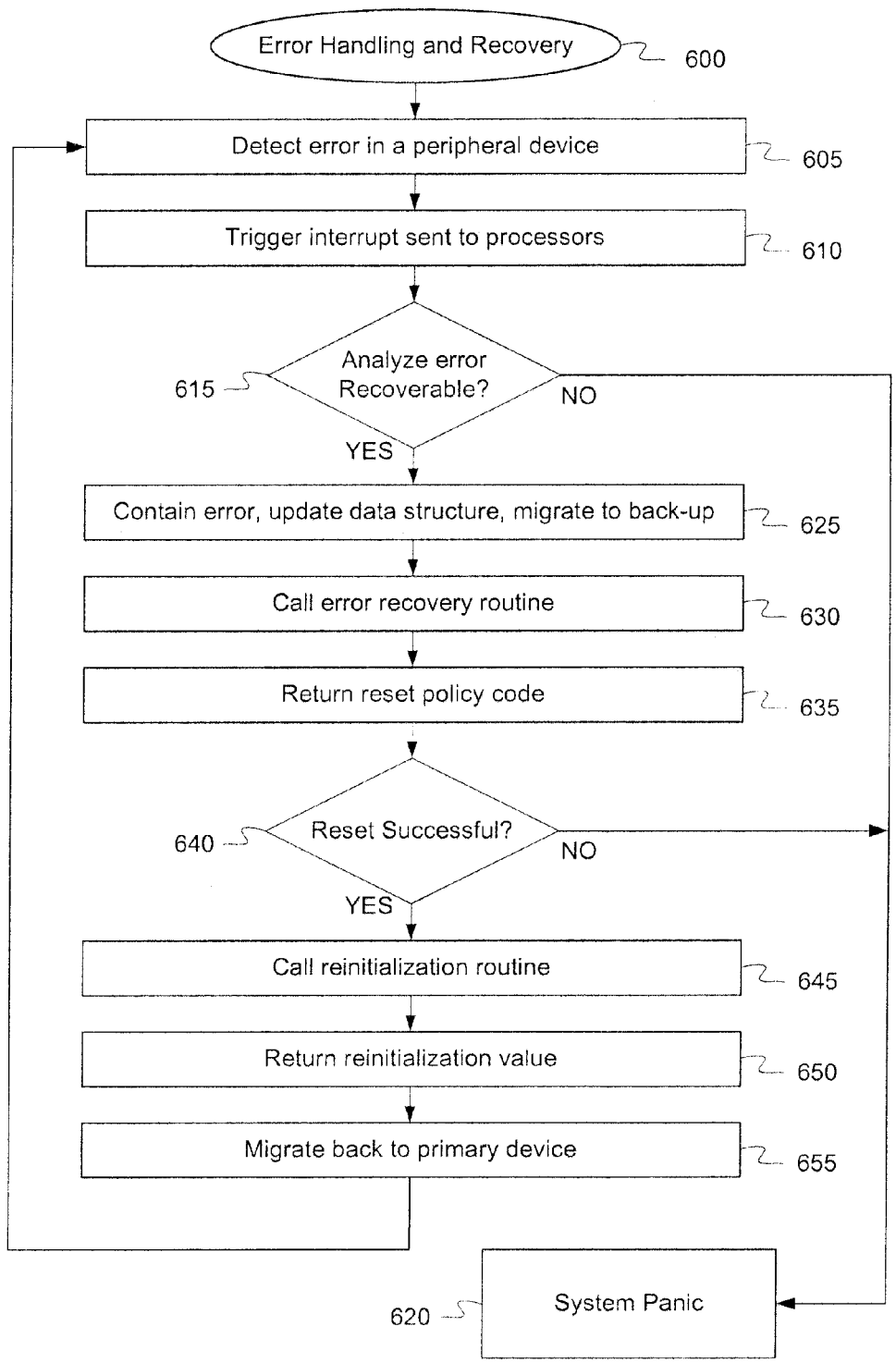
FIG. 6 illustrates a flow diagram of one embodiment of the error handling and recovery method.

FIG. 6 illustrates a flow diagram of one embodiment of an error handling and recovery method. The method 600 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 600 is performed by storage system 2 of FIG. 1. In one embodiment, at block 605, method 600 detects an I/O error in a peripheral device, such as peripheral device 25, 26, 27, 29 or 30 of FIG. 3. Error detection may be accomplished according to any of several known methods, including for example, examining the PCI status register, the PCIe capability register set or the PCIe Advanced error reporting register set of the PCI-Express standard. At block 610, method 600 generates an error message signal which is sent upstream to the system processors, such as processors 21. The processors trigger an interrupt which is sent to the Error Handler domain 520, as shown at arrow A of FIG. 5. In one embodiment, a fatal error in the peripheral device will trigger a non-maskable interrupt (NMI) by chipset 512. The error message and interrupt provide a basic analysis of a device failure that identifies the failed peripheral device. The interrupt also provides a register dump that can be used for detailed analysis. The flow represented by the error detection and reporting arrows in FIG. 5 may include features in the industrial standard, such as PCI or PCI-Express.

At block 615, the error reporting module 522 analyzes the type of error specified in the error message signal and the interrupt to determine whether the error can be recovered from. If the error cannot be recovered from, at block 620, method 600 initiates a system panic. If the error reporting module 522 determines that the error is not recoverable, a system panic 524 is initiated. The system panic includes actions taken by the operating system 24 upon detecting an internal fatal error from which it cannot safely recover. In some embodiments, the system could continue operation after the error occurs, however, rather than risk data corruption in the unstable state, the panic is initiated to stop further damage and facilitate diagnosis of the error. In the event of a system panic, the entire operation of the storage server is migrated to the cluster partner, if available. The migration may occur using techniques that are well known to those skilled the art. If the error can be recovered from, method 600 proceeds with device recovery at block 625. In one embodiment, the operations represented by blocks 625-655, discussed below, are referred to as recovery operations.

At block 625, method 600 contains the error to prevent the failed device from continually sending error message signals and monopolizing the processors, and updates the device data structure. In one embodiment, these steps in the recovery method are performed by device recovery module 526. In one embodiment, the contents of the interrupt are used by error handling software 552 to identify the failed peripheral device, as well as the type of error. In the event that the error is recoverable, a second operation exists in the Error Handler domain 520. If a driver for the failed peripheral device has registered with error handling and recovery, the Error Handler domain 520 will enter a device recovery operation at module 526 to prepare the device for recovery, as shown as arrow B of FIG. 5. The device recovery operation at module 526 includes the tasks of device error containment and a device data structure update.

If a device suffering an error is not properly contained, the system will continue to generate interrupts which may eventually flood the system. In such a case, all the processors in the system will repeatedly end up in an error handler mode, reentering the error handling mode shortly after exiting from it. This will render the processors unable to resume proper file services until the peripheral device errors are contained. The objective for error containment is to make sure that all data traffic is terminated as soon as possible, thus enabling normal operation of the storage server to continue uninterrupted. In one embodiment, error containment causes the processor 21 to eliminate access to the device by the rest of the system. For example, the PCI-Express hardware is setup not to report any further errors. This may include setting the Device Control register of the PCI-Express standard to disable error delivery. In another embodiment, error containment causes the processor 21 to power the device off.

Updating the device data structure by error handling software 552 includes changing the data structure to indicate that the device has encountered a fatal error. This change makes it possible for the new device driver interface to detect and return failures for routines called to access the device. A flag is added to the data structure to mark the device as not useable and to reject further requests for access to the device. In one embodiment, the data structure is native to the FreeBSD operating system, however, in alternative embodiments, other data structures are used.

Also at block 625, the operations of the failed peripheral device are migrated to a back-up peripheral device, such as those illustrated in FIG. 3. All requests for the use of the failed peripheral device are directed by processor 21 to the back-up peripheral device during the time period that the failed device is being reset. This enables the storage server 2 to continue serving the requests of client devices 1 without interruption. The migration may be performed by a high-level software stack, executed by processor 21, such as for example a network or storage stack. In one embodiment, the network stack re-routes any requests to access the failed peripheral device to the back-up peripheral device.

At block 630, method 600 proceeds to the Error Recovery domain 530, where the method calls an error recovery routine from the device Driver Recovery domain 540. To take advantage of error handling and recovery, the device driver 556 for the peripheral device registers the device with error handling and recovery. A driver error recovery interface implements this process. In addition to the driver recovery routine and the device reinitialization routine discussed above, the device driver 556 provides a device identifier that specifies the peripheral device that is requesting error handling and recovery. In one embodiment, the device identifier is a device cookie (not shown). Once the peripheral device is registered with error handling and recovery, the Error Handler module 520 can process the failed device as described herein.

A routine from the driver recovery module 542 for the failed peripheral device is called at arrow D in the recovery process. In one embodiment, the recovery routine 542 is responsible for device specific error analysis, device specific reset, driver data structure and resource cleanup, and reporting errors for clients. The device driver 556 has the first opportunity to examine a failed device and to apply a device specific reset policy. The driver releases any data structures and resources that have been allocated for the current operations of the device. The driver also wakes-up blocked clients and returns any errors. One option to clean-up the data structures is to wait until all clients have closed their connections. However, the actual implementation will be device specific. It is the responsibility of the driver to make sure proper synchronization is performed with the rest of the drivers to make sure common data structures are not freed prematurely.

At block 635, method 600 returns a reset policy code to the device reset policy module 532. In one embodiment, the reset policy code has the following values: no action; reset device; power cycle device; or panic system. If the driver has not already reset the peripheral device, the device reset policy module 532 in Error Recovery domain 530 applies the chosen recovery method and waits for the failed device to come out, reset, or power cycle. In one embodiment, a link status register in a PCI-Express capability register set is monitored to make sure a proper link renegotiation has occurred. In addition, PCI resources allocated for the failed device are restored after the chosen recovery method by restoring its configuration space registers.

The first three options are returned by the driver recovery module 542 to device reset policy module 532 if the device reset is successful. Driver recovery module 542 requests system panic only if all options are exhausted. In that case, control will be passed on to recovery policy module 534 to panic the system. If the reset policy module 532 cannot revive the failed device, control is passed on to the recovery policy module 534 without calling a routine from the device reinitialization module 544. For example, if the link renegotiation fails, control is passed on to recovery policy module 534 to power off the device.

At block 640, method 600 determines whether the driver recovery routine was successful, meaning that the failed device was correctly reset. If the chosen recovery method was not successful, method 600 initiates a system panic at block 620. If the chosen recovery method was successful, at block 645, method 600 calls a device reinitialization routine from the device reinitialization module 544 in the Driver Recovery domain 540. This routine call is shown at arrow F in FIG. 5. At block 650, method 600 returns a device reinitialization value to the device recovery policy module 534. In one embodiment, the values for the return code include: no action; power off device; and panic system. If the failed device can function normally again no action is required. If the failed device can no longer be used safely, it can be powered off by processor 21 until it can be serviced. The PCI data structure is also be cleaned up to reflect the returned code, including any entries in the device file system. The value of system panic is used when the device driver 556 has determined that no recovery is possible and system integrity is more important than the continued operation of the failed device.

At block 655, method 600 migrates the operations of the back-up peripheral device back to the newly reinitialized peripheral device. Method 600 continues to check for errors and repeats, beginning at block 605, if a new error is detected.

The above description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of the present invention include various operations, which are described above. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable storage medium. These instructions may be used to program a general-purpose or special-purpose processor to perform the described operations. A machine-readable storage medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing devices and special-purpose processing device(s).

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the above descriptions, embodiments have been described in terms of objects in an object-oriented environment. It should be understood, that the invention is not limited to embodiments in object-oriented environments and that alternative embodiments may be implemented in other programming environments having characteristics similar to object-oriented concepts.

In the foregoing specification, the invention has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:

1. A method comprising:
   detecting, by a processor, an error in a peripheral device and sending an error message to an error handler domain;
   containing the error within the error handler domain, wherein the error handler domain isolates the peripheral device to prevent propagation of the error, and wherein preventing propagation of the error comprises setting up the peripheral device to stop reporting the error and marking a device driver of the peripheral device to not accept further operating system requests;
   signaling, by the error handler domain, an error recovery domain that the peripheral device is setup for error recovery;
   migrating, by the error handler domain, operations of the peripheral device to a back-up peripheral device;
   calling, by the error recovery domain, an error recovery routine provided by a device driver;
   receiving, by the error recovery domain, a reset policy code specifying a result of the error recovery routine from the device driver;
   calling, by the error recovery domain, a device reinitialization routine provided by the device driver;

receiving, by the error recovery domain, a reinitialization value specifying a result of the device reinitialization routine from the device driver; and migrating, by the error handler domain, operations of the back-up peripheral device back to the peripheral device.

2. The method of claim 1, further comprising generating an interrupt signal to report the error.

3. The method of claim 1, further comprising:
determining whether the error is recoverable;
if the error is recoverable, performing recovery operations; and
if the error is not recoverable, initiating a system panic.

4. A system comprising:
a peripheral device having a device driver;
a back-up peripheral device;
a processor unit; and
a memory, coupled to the processor unit, the memory storing instructions, executable by the processor unit, for:
detecting, by the processor, an error in the peripheral device and sending an error message to an error handler domain;
the error handler domain to receive the error message;
the error handler domain to prevent the peripheral device from propagating the error, and wherein preventing propagation of the error comprises setting up the peripheral device to stop reporting the error and marking a device driver of the peripheral device to not accept further operating system requests;
the error handler domain to signal an error recovery domain that the peripheral device is setup for error recovery;
the error handler domain to migrate operations of the peripheral device to the back-up peripheral device;
the error recovery domain to call an error recovery routine provided by the device driver and to receive a reset policy code specifying a result of the error recovery routine provided by the device driver;
the error recovery domain to call a device reinitialization routine provided by the device driver; and
the error recovery domain to receive a reinitialization value specifying a result of the device reinitialization routine.

5. The system of claim 4, wherein the peripheral device comprises one of a mass storage device, a memory device, and a network device.

6. The system of claim 4, wherein the error handler domain comprises an error reporting module and a device recovery module.

7. The system of claim 6, wherein the error reporting module is configured to analyze a received error message signal and determine whether the error is recoverable.

8. The system of claim 6, wherein the device recovery module is configured to contain the error by isolating the peripheral device to prevent the generation of interrupt signals.

9. A system, comprising:
a processor unit; and
a memory, coupled to the processor unit, storing instructions which, when executed by the processor unit, cause the system to:
detect, by a processor, an error in a peripheral device and send an error message to an error handler domain;
contain the error within the error handler domain, wherein the error handler domain isolates the peripheral device to prevent the propagation of the error, and wherein preventing propagation of the error comprises setting up the peripheral device to stop reporting the error and marking a device driver of the peripheral device to not accept further operating system requests;
signal, by the error handler domain, an error recovery domain that the peripheral device is setup for error recovery;
migrate, by the error handler domain, operations of the peripheral device to a back-up peripheral device;
call, by the error recovery domain, an error recovery routine provided by a device driver;
receive, by the error recovery domain, a reset policy code specifying a result of the error recovery routine provided by a device driver;
call, by the error recovery domain, a device reinitialization routine provided by the device driver;
receive, by the error recovery domain, a reinitialization value specifying a result of the device reinitialization routine; and
migrate, by the error handler domain, operations of the back-up peripheral device back to the peripheral device.

10. The method of claim 9, wherein the instructions further cause the system to generate an interrupt signal to report the error.

11. The method of claim 9, wherein the instructions further cause the system to:
determine whether the error is recoverable;
if the error is recoverable, performing recovery operations; and
if the error is not recoverable, initiate a system panic.

* * * * *